United States Patent Office 3,138,124
Patented June 23, 1964

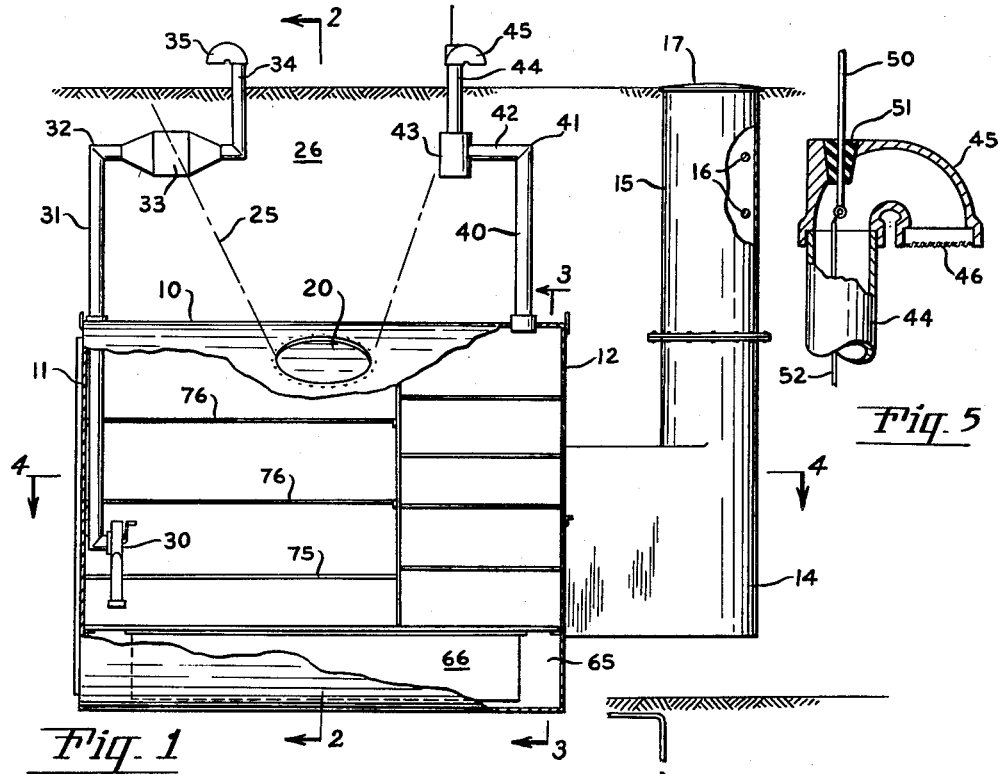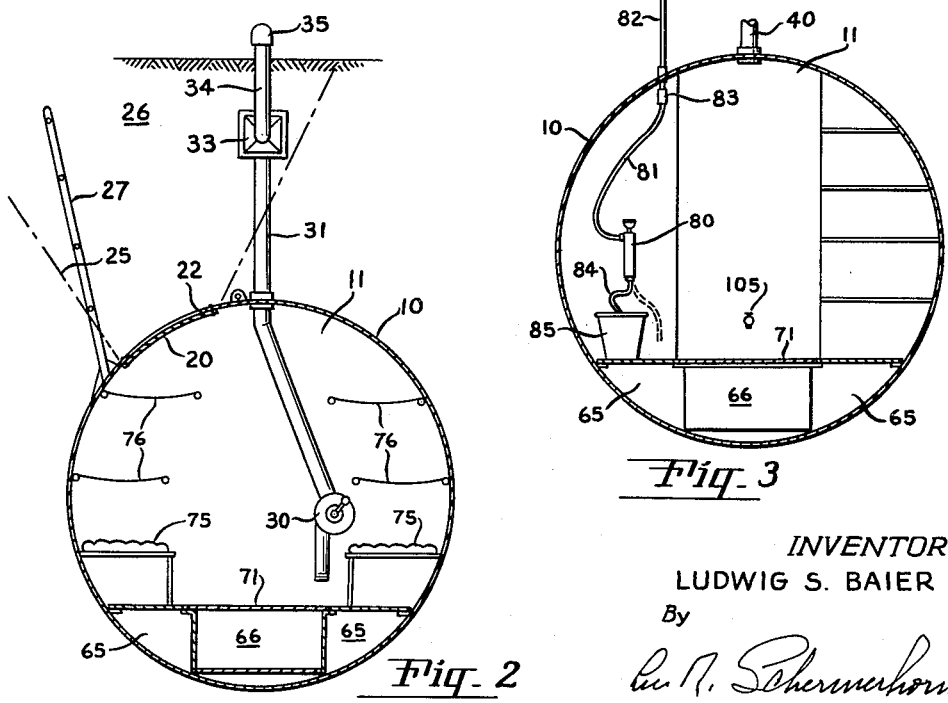

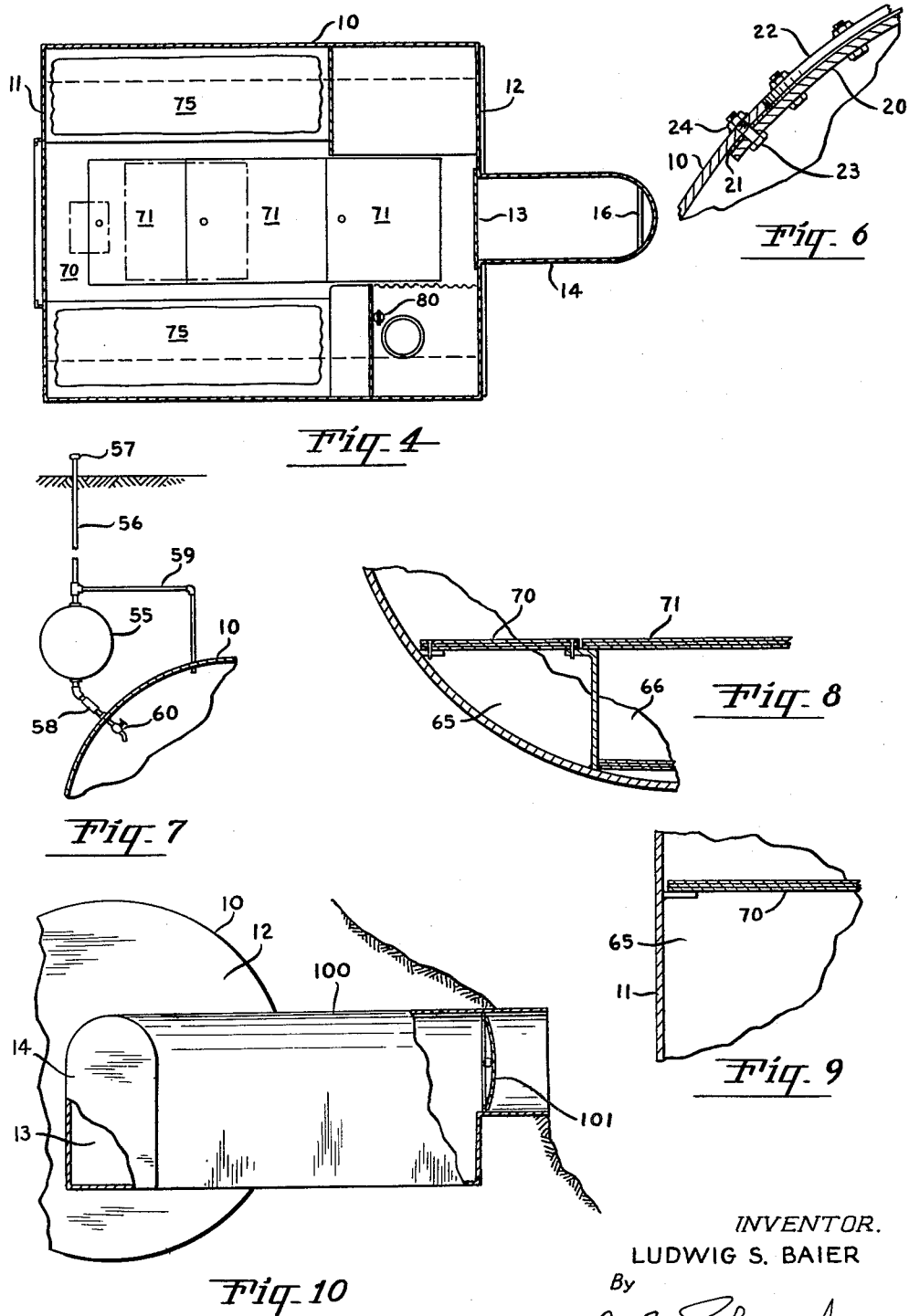

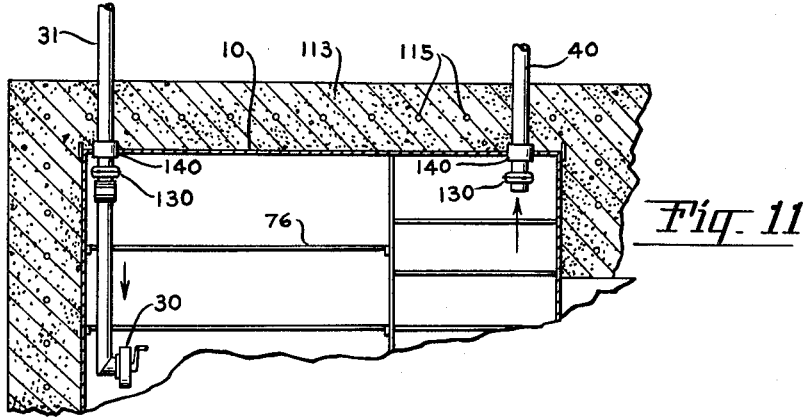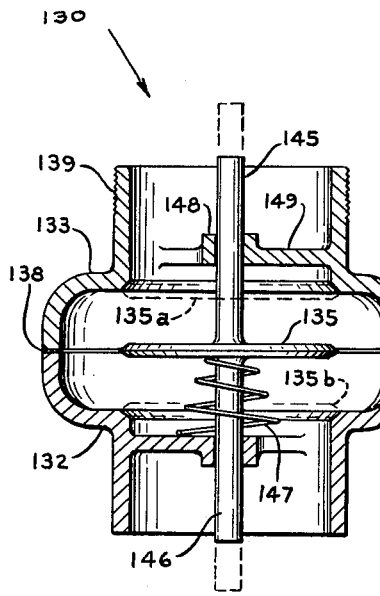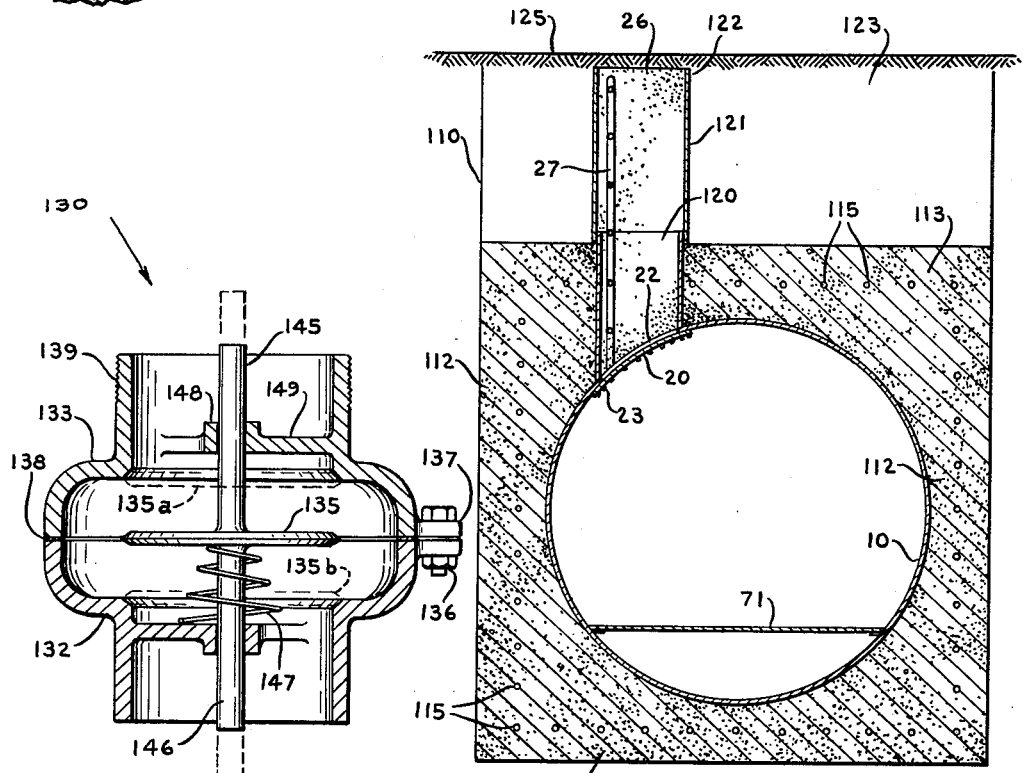

3,138,124
FALL-OUT SHELTER
Ludwig S. Baier, Portland, Oreg.
(P.O. Box 158, Tolovana Park, Oreg.)
Filed Feb. 26, 1962, Ser. No. 175,397
5 Claims. (Cl. 109—1)

This invention relates to an underground shelter for protection against harmful radiation from the fall-out debris of a nuclear explosion.

Objects of the invention are to provide a shelter of the type described which is of relatively simple and inexpensive construction and easy to install, to provide a shelter which affords adequate fallout protection, to provide a shelter which provides for such necessities of human existence as an adequate supply of clean pure air to breathe, water for drinking and sanitary purposes and means for the disposal of waste water and products, to provide a shelter suitable for prefabrication in mass production, to provide a novel basic form of construction which may readily be enlarged for increased capacity without alteration of most of its component parts, to provide a shelter having an entrance tube offset from the shelter and fitted with a blast-resistant airtight cover, and to provide a shelter which may readily be strengthened to serve as a blast-resistant shelter by reenforcing with concrete.

The present shelter comprises essentially a cylindrical steel shell equipped with benches, bunks, ventilating means, potable and sanitary water supplies and waste disposal means. This shell is installed in an excavation and covered with sufficient earth to prevent the penetration of harmful radiation from the surface. There is also provided an emergency exit or escape hatch in case the main entrance should become blocked.

The invention will be better understood and additional objects and advantages will become apparent from the following description of the preferred embodiment illustrated in the accompanying drawings. Various changes may be made, however, in the construction and arrangement of parts, and certain features may be used without others. All such modifications within the scope of the appended claims are included in the invention.

In the drawings:

FIGURE 1 is a side elevation view, with parts broken away, showing a shelter embodying the principles of the present invention;

FIGURE 2 is a cross sectionnal view taken on the line 2—2 of FIGURE 1;

FIGURE 3 is a cross sectional view taken on the line 3—3 of FIGURE 1;

FIGURE 4 is a sectional view in plan taken on the line 4—4 in FIGURE 1;

FIGURE 5 is an enlarged fragmentary view partly in section, showing the air outlet and radio antenna;

FIGURE 6 is a fragmentary sectional view of the escape hatch;

FIGURE 7 is a fragmentary view showing a drinking water supply;

FIGURE 8 is a fragmentary enlarged sectional view showing a detail of the floor construction;

FIGURE 9 is another enlarged sectional view showing a detail of the floor construction;

FIGURE 10 is a fragmentary side elevation view showing a modified entrance arrangment;

FIGURE 11 is a fragmentary longitudinal sectional view showing how the present shelter may be made blast resistant by encasing it in reenforced concrete;

FIGURE 12 is a cross sectional view of FIGURE 11 through the escape hatch; and

FIGURE 13 is an enlarged view, with parts in section, showing the construction of the double check valves employed in the ventilating system in FIGURE 11.

The shell of the shelter comprises a cylinder 10 welded from steel plate so as to be watertight. The ends are closed by welded circular steel plates 11 and 12, the latter having an opening for an entrance door 13. Welded to the end plate 12 in communication with the door 13 is a steel vestibule 14 surmounted by a vertical circular steel entrance tube 15 equipped with ladder rungs 16. This structure rests in an excavation with the top of the shell 10 several feet below ground level. After installation of the shell and its appurtenances in the excavation, the latter is backfilled to cover the shell as shown, the upper end of the entrance tube 15 projecting above ground level only sufficiently to keep out surface water and dirt.

The entrance tube 15 is closed by a suitable gasketed airtight metal hatch cover 17 which seals in the upper end of tube 15. The hatch cover is in general similar to the hatch covers employed in the decks of ships with the additional features that it slightly overhangs the outside of tube 15 and has a smoooth convex upper surface whereby any fall-out dust accumulated thereon will be washed or blown off clear of the tube 15 by rainfall or wind. As in the case of ships' hatch covers, it is equipped with locking means which may be released either from the outside or underside.

An emergency escape hatch is also provided. As shown in FIGURE 6, a curved plate 20 is mounted on the inside of an upper portion of the shell and equipped with a gasket 21 to seal a hatch opening 22 in the shell 10. The plate 20 is secured by a plurality of bolts 23 which are threaded into nuts 24 welded to the outside of shell 10. When the excavation is backfilled on top of the shell 10, a conical hole 25 is left open above the escape hatch. This conical hole is then filled with loose sand 26 and the surface may be sodded or otherwise disposed in conformity with the surrounding landscope.

In the event that the main hatch cover 17 might become covered with debris from fallen buildings or the like so that it could not be opened from the underside, the occupants can escape by removing the bolts 23 from emergency hatch plate 20. The loose sand 26 and any surface sod will then fall in through the opening 22 leaving a clear opening up to ground level for the occupants to crawl out. In order to facilitate escape in such event, a metal ladder 27 is bolted to the outside of shell 10 adjacent to the opening 22. This ladder extends up through the sandfill 26 to within a foot or so of the surface of the ground whereby it is normally covered by the sand and sod.

Fresh air is drawn into the shelter as needed by a rotary hand pump 30. The intake of pump 30 is connected with a vertical pipe 31 extending out through the top of the shell to an elbow 32. A filter 33 is offset laterally from the pipe 31 and the intake to the filter is connected with a vertical pipe 34 extending up slightly above the surface of the ground and capped with a return bend 35 to prevent the entrance of falling dust and rain water. Any radioactive dust present in the air is trapped in filter 33 which is separated by a thick layer of earth from the top of the shelter so that radiation from the filter will not reach the shelter.

An air outlet pipe 40 extends straight up from the top of the shelter to an elbow 41 near the surface of the ground. A pipe 42 then extends horizontally to a trap 43 from whence a vertical pipe 44 extends up through the surface of the ground and is capped with a return bend 45 similar to the fitting 35 on the inlet pipe 34. Both of these return bends are equipped with a screen 46, as shown in FIGURE 5, to keep out insects and rodents. The trap 43 will catch any dust and dirt which may enter from the outside. The fitting 45 is equipped with a radioreceiving antenna 50 mounted in an insulator 51. An insulated lead-in wire 52 extends from the antenna through the trap 43 and pipes 42 and 40 to the interior of the shelter for radio reception.

Potable water for drinking is stored in a tank 55 outside the shelter, the tank being covered by a sufficient depth of earth to absorb harmful radiation from above. The tank is filled through an inlet pipe 56 extending above the ground level, the upper end of which is closed by a cap 57. A connection 58 from the bottom of the tank extends through the shell wall and is equipped with a valve or faucet 60 inside the shelter. A vent 59 from the tank terminates inside the shelter.

Water for sanitary purposes is stored inside the shelter in open tanks 65 on opposite sides of a dry storage locker 66. Overlying these tanks is a fixed floor 70 and overlying the locker are removable floor panels 71. The diameter of shell 10 is sufficient to provide standing room on the floor between the side bunks or benches 75. Above the benches 75 are hinged additional bunks 76 which may be folded up out of the way when not in use.

FIGURE 3 shows a piston-type hand pump 80 for disposing of waste water. The outlet of this pump passes through a flexible hose 81 connected with a disposal pipe 82. Pipe 82 may drain off to the surface of the ground at a lower elevation or it may extend above the surface of the ground and discharge on top of the ground at a distance from the shelter. A check valve 83 prevents backflow from pipe 82 so that hose 81 may be disconnected from this pipe if desired.

For example, the suction hose 84 from the pump 80 may normally be used for the removal of waste water from the pail 85 but by dropping the end of the hose 84 into one of the tanks 65 and disconnecting the hose 81 from the pipe 82, the pump 80 may be used to lift sanitary water from the tank for wash purposes and the like. Floor 70 may be provided with an opening to receive the hose for this purpose.

Water may also be obtained from moisture condensation on the inside of shell 10. Such moisture is allowed to run down into the tanks 65 through a gap along the edge of floor 70.

In some installations the excavation for the shelter may accumulate water to a sufficient depth to cause the shell 10 to become buoyant. To relieve the external pressure of ground water a tap 105 in FIGURE 3 may be provided in end wall 11 to withdrawn this water inside the shelter. Such tap may be equipped with a valve or faucet to draw it off as desired, or it may be allowed to run into the tank 65 which preferably extends across end wall 11. When such water accumulates faster than it is needed, it may be discharged to the outside by means of pump 80.

FIGURE 10 shows an alternative entrance arrangement when the shelter is located in a hillside. In this case a steel tube 100 leads from one side of vestibule 14 horizontally to the sloping surface of the ground. The outer end of this tube is closed by a hatch cover 101 which may be opened from either the inside or outside. The hatch covers 17 and 101 are built to withstand blast effects up to thirty pounds per square inch overhead pressure. Both hatch entrance tubes 15 and 100 extend at such an angle from the vestibule 14 as to prevent radiation through the hatch covers from entering the main shell 10 of the shelter.

It is apparent that the cylindrical shell 10 may be lengthened as desired to accommodate any size of family group without altering the other structural features. In a long shell, partitions may be installed to provide separate compartments for sleeping and living quarters, etc. If blast protection is desired the shell may be encased in reenforced concrete when it is installed in the excavation. In any event, the outside hatch cover is built to withstand considerable blast pressure as just described.

Where sub-surface conditions prevent full depth excavation, a mound of earth may be built over the shelter and suitably landscaped so that in no case does the present shelter detract from the appearance of the yard or space where it is installed.

FIGURES 11 and 12 show how the shelter may be made blast resistant. The bottom of the open excavation 110 is first filled with a layer of concrete 111 and the shell 10 is placed on top of this. Then additional concrete is poured over the shell, filling the spaces 112 between the shell and the sides of the excavation and providing a layer of concrete 113 on top of the shell. Before and during the pouring of the concrete, reenforcing steel 115 is installed whereby the steel shell 10 is completely encased in reenforced concrete.

When the shell is to be thus reenforced, a cylindrical steel coaming 120 is welded to the outside of the shell around the hatch 22. The ladder 27 is attached in a vertical position within this coaming and a heavy carboard cylinder 121 is dropped over the ladder, the cylinder 121 being of a size to fit over the outside of the coaming 120. The cylinder 121, like the ladder, is of a length to reach almost to the level of the surface of the ground at 122. Tube 121 is then filled with loose sand 26 while the rest of the excavation is backfilled with earth 123. The surface of the backfill may be sodded or planted at 125 as desired.

If it becomes necessary to use the escape hatch, the bolts 23 are loosened from inside the shelter allowing the sand 26 to flow down into the shelter. Upon removal of hatch cover 20 any sod above the sand will fall into the shelter, leaving the tube 121 open to the surface of the ground. The occupants can then climb up ladder 27 through the tube 121.

When the present shelter is installed as a blast-resistant shelter as just described, the air inlet and outlet pipes 31 and 40 are provided with two-way check valves 130. The construction of valves 130 is shown in FIGURE 13. Two identical cast metal members 131 and 132 form a circular chamber 133 containing a flat, circular metal valve 135. These members are secured together by bolts 136 through a plurality of ears 137, the joint being sealed by a gasket 138. The neck ends of the members 131 are threaded at 139 for connection with the shell fittings 140 which receive the pipes 31 and 40, and the members 132 may be similarly threaded, if desired.

The valve plate 135 is equipped with a pair of opposite axial shafts 145 and 146 for vertical sliding movement in the apertured hubs 148 of upper and lower spiders 149. The valve rests on a helical spring 147 on the lower spider. Spring 147 supports the valve plate 135 in central position as shown in solid lines, allowing ventilating air to pass around it. The hand crank blower 30 is incapable of producing an air velocity through the pipes 31 and 40 which will move the valve plates 135, but the springs 147 permit the valves to move readily under the effect of blast pressure in the atmosphere.

When a pressure wave travels down the pipes 31 and 40, the valves seat in bottom position as indicated in broken lines at 135b, closing both ventilating pipes until the pressure wave has dissipated. This prevents blast pressure from entering the shelter through the outside ventilation system. Following the pressure wave of such a blast, the atmosphere may become rarified to a very low pressure approaching a vacuum. When this occurs the sudden rush of air out of the shelter lifts both valves 135 to their upper seating position shown in broken lines at 135a, thereby maintaining normal pressure within the shelter. Upon cessation of violent pressure oscillations in the atmosphere, the valves 135 return to their open central positions shown in solid lines, whereby the ventilation system is restored to normal operative condition. The valves may be considered as biased toward open position by the action of spring 147 in opposition to the force of gravity. The two forces are in equilibrium when the valve is in open, centered position.

Having now described my invention and in what man- ner the same may be used, what I claim as new and desire to protect by Letters Patent is:

1. The method of installing an underground shelter comprising digging an excavation, providing a rigid shell having an entrance hatch and having an escape hatch in an upper portion of said shell, placing said shell in said excavation, backfilling with earth over all of said shell except said hatches leaving an opening in said backfill above said escape hatch, and then filling said opening with loose sand.

2. An underground shelter comprising a rigid shell adapted to be buried in an excavation, closable entrance means connected with said shell, a floor spaced above the bottom of the shell, a dry storage space under the center of said floor, water tanks under said floor on opposite sides of said storage space, said shell having side walls subject to moisture condensation extending below said floor and forming outer walls for said tanks, said floor being spaced from said walls sufficiently to allow said moisture condensation to run into said tanks, a water tank adapted to be buried outside of said shell, a discharge pipe for said outside tank extending within said shell, a vent for said outside tank extending within said shell, a waste disposal pipe extending upward outside of said shell, a pump in said shell, and flexible suction and discharge hoses on said pump, said discharge hose being connectable with said waste pipe.

3. A shelter as defined in claim 2 including a water tap in said shell above one of said under floor tanks for withdrawing ground water from said excavation.

4. A shelter comprising a rigid shell buried in the ground, a closable entrance hatch to said shell, an escape hatch in a top portion of said shell, an earth backfill covering all of said shell except said hatches, a loose sand backfill covering said escape hatch, a ladder on said shell extending upward from said escape hatch through said sand backfill substantially to the surface of the ground, a floor spaced above the bottom of the shell, a dry storage space under the center of said floor, water tanks under said floor on opposite sides of said storage space, said shell having side walls subject to moisture condensation extending below said floor and forming outer walls for said tanks, said floor being spaced from said walls sufficiently to allow said moisture condensation to run into said tanks.

5. A shelter comprising a rigid shell buried in the ground, a closable entrance hatch to said shell, an escape hatch in a top portion of said shell, a ladder connected to said shell extending upward from said escape hatch substantially to the surface of the ground, a coaming around said escape hatch, an encasement of reinforced concrete around said shell outside of said coaming, a cardboard tube enclosing said ladder and extending from said coaming substantially to the surface of the ground, an earth backfill around said tube and covering all of said shell except said hatches, and a loose sand backfill in said tube and coaming covering said escape hatch.

References Cited in the file of this patent

UNITED STATES PATENTS

| | | |
|---|---|---|
| 1,397,739 | Moyer | Nov. 22, 1921 |
| 2,022,143 | Mottershall | Nov. 26, 1935 |
| 2,296,984 | Corbetta | Sept. 29, 1942 |
| 2,830,675 | Drager | Apr. 15, 1958 |
| 2,955,549 | Frankfort | Oct. 11, 1960 |
| 2,968,130 | Bascom | Jan. 17, 1961 |
| 3,074,080 | Previti | Jan. 22, 1963 |
| 3,075,448 | Cohen | Jan. 29, 1963 |
| 3,103,154 | Rosenfeld | Sept. 10, 1963 |

OTHER REFERENCES

Publication—"Popular Mechanics," issue of March 1958, vol. 109, page 148.

Publication—"The Family Fallout Shelter," publication of the Office of Civil and Defense Mobilization, #MP–15, June 1959, 32 pp.